UNITED STATES PATENT OFFICE 2,562,759

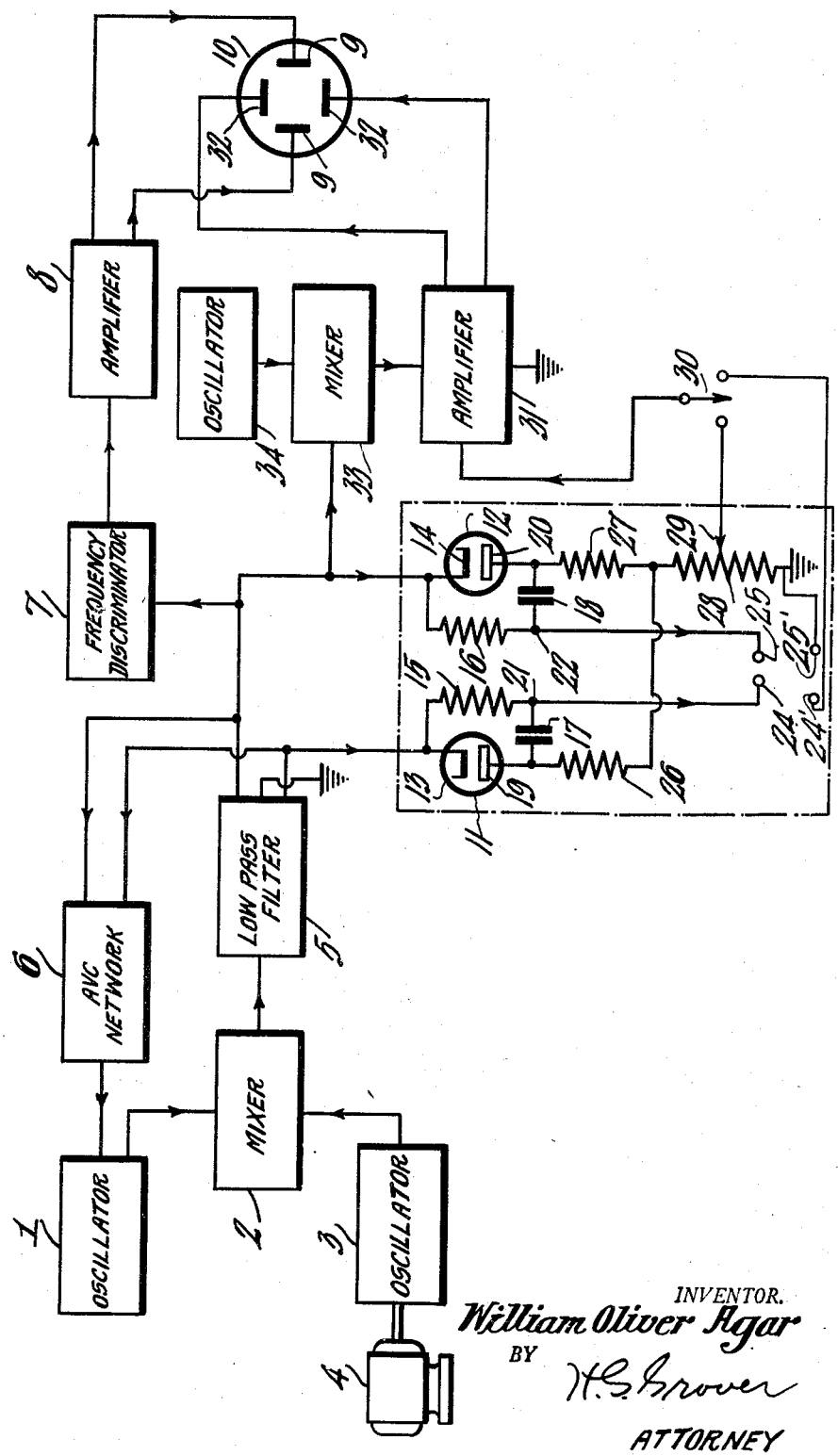

RADIO AND LIKE INSTRUMENTS FOR USE IN HIGH-FREQUENCY TESTING RESEARCH AND DEVELOPMENT

William Oliver Agar, Danbury, England, assignor, by mesne assignments, to Radio Corporation of America, New York, N. Y., a corporation of Delaware Application February 28, 1947, Serial No. 731,652
In Great Britain February 13, 1946

Section 1, Public Law 690, August 8, 1946
Patent expires February 13, 1966

8 Claims. (Cl. 175—183)

This invention relates to radio and like instruments for use in high frequency testing research and development and has for its object to provide improved instruments capable of providing for oscillographic examination of the behaviour of aerials, feeders, television apparatus, radio components, filters and impedance members generally over a wide range of frequencies.

Considerable difficulty is experienced and much time spent in the design and development-testing of apparatus required to operate uniformly or in accordance with a predetermined characteristic over a wide frequency band. For example it may easily take months of intensive work to develop, with the aid of the ordinary high frequency bridge measuring apparatus, a satisfactory transmitting aerial to cover an abnormally wide band such, for example, as the band 1 to 20 mc./s. with substantially flat impedance curve, it being necessary, with such apparatus, to plot the impedance step by step over the frequency range, made whatever design changes may be indicated by these tests, repeat the tests—and so on until a satisfactory result is achieved. The present invention seeks to provide an improved test or development instrument which is much quicker to use in a case such as that just envisaged than the normal high frequency test gear of bridge type.

According to this invention a radio or like test or development instrument comprises in combination a fixed frequency oscillator, a variable frequency oscillator, means for continuously and cyclically varying the frequency of the variable oscillator over a predetermined range, a mixer stage fed from the two oscillators, a filter fed from the mixer stage and adapted to pass one only of the varying beat frequencies produced at the mixer stage, means for producing frequency dependent voltage varying in dependency upon the frequency of said output, a rectifier circuit having terminals for the inclusion of the device or network to be tested and fed with said output so that the current in said rectifier circuit is dependent upon the impedance of said device or network and means for taking off (for use in an oscillograph) the frequency dependent voltage and voltage proportional to the current in the rectifier circuit.

Preferably the frequency dependent voltage is produced by a discriminator circuit fed with output from the filter.

Preferably also a cathode ray tube oscillograph is employed in conjunction with an instrument in accordance with this invention in which case the voltage taken off from the discriminator circuit (or other means for producing the frequency dependent voltage) is applied to one and the other voltage taken off from the rectifier is applied to the other, of the normally provided mutually perpendicular deflection systems of the tube.

Preferably also a portion of the output from the filter is employed for automatic volume control of one or both oscillators—the most convenient arrangement is AVC of the fixed oscillator only—to maintain substantially constant amplitude at the output terminals of the filter.

The invention is illustrated in the accompanying diagrammatic drawing which shows a preferred embodiment of the invention as applied to an instrument operating in a continuous manner over a frequency range of 1 to 21 mc./s. It is to be understood, however, that the values of frequencies and other quantitative data given are purely by way of example and that the invention is in no sense limited thereby.

Referring to the drawing the output from a fixed frequency discharge tube oscillator 1 operating at 39 mc./s. is fed as one input to a discharge tube mixer stage 2 of any convenient design well known per se. The second input to the mixer stage is provided by a variable frequency discharge tube oscillator 3 capable of producing any frequency between 40 and 60 mc./s. in dependence upon the setting of its tuning condenser. This condenser is preferably of the so-called "butterfly" rotary vane type and is continuously rotated by an electric motor 4 at, say 90 R. P. M. Since, with this type of condenser, the frequency of oscillation will vary from maximum to minimum and back to maximum twice per revolution the frequency sweep will go backwards and forwards three times per second for the stated speed of 90 R. P. M.

The output from the mixer 2 will consist of the sum and difference frequencies. This output is fed to a low pass filter 5 which passes the difference frequency only so that the filter output will consist of a frequency varying continuously from 1 to 21 mc./s. and back again. Part of the filter output is tapped off to control an AVC network 6 of any known type which operates on the fixed frequency oscillator 1 to maintain the filter output amplitude constant.

Output from the low pass filter 5 is also taken to a frequency discriminator 7 at which the voltage developed across a capacity into which the varying frequency is fed with constant voltage is picked off. As the frequency varies so will the developed voltage. The picked off voltage, which is dependent upon the frequency is rectified and amplified at 8 and passed to the horizontal deflecting plates 9 of a cathode ray tube oscillograph 10 fitted with a screen giving a moderately long afterglow.

Output from the filter 5 is also taken to a rectifier circuit shown within the chain line square and including a pair of diodes 11, 12 each having its cathode 13 or 14 connected to one or other of the line output terminals of the filter 5 (the filter output circuit is shown as of the balanced type with its centre point earthed). Across each diode is connected a low value resistance 15 or 16 (say 50 ohms each) in series with a condenser 17 or 18 adjacent the anode 19 or 20, the reistance-condenser junction points 21 or 22 being connected through suitable switches (not shown) to terminals 24, 25 to which an impedance or device (not shown) to be tested may be connected.

The anodes 19, 20 are connected each through a decoupling resistance 26 or 27, to a common point which is taken to earth through a load resistance 28 and a variable tap 29 on this resistance 28 is taken through a two position switch 30 to an amplifier 31 whose output is passed to the vertical deflection plates 32 of the oscillograph 10. It will be seen that since the low value resistance elements 15, 16 are in series with the impedance or device connected to terminals 24 and 25 under test and since the voltage input amplitude to the rectifier network is constant, the high frequency voltage appearing across the said low resistances will depend upon the ratio of the test impedance thereto. The D. C. component of the rectified H. F. voltage across the low resistances 15, 16 appears over the decoupling resistances 26, 27 and the load resistance 28 from which, after suitable amplification at stage 31, it is passed to the oscillograph 10.

Output from the filter 5 is also taken to a further mixer circuit 33 receiving its second input from a 1 mc./s. oscillator 34 having a very high harmonic content, the mixer output being fed to the amplifier 31. This arrangement of elements 33—34 acts as a calibrating unit since relatively large voltages are produced in mixer 33 in the region within plus or minus 5 kc./s. of zero beat and the horizontal scale is sufficiently contracted in practice effectively superimposing small vertical deflections on the horizontal trace of the cathode ray tube every megacycle. The calibration unit may be operated continually or it may be operated alternatively with the impedance measuring circuitry, an electronic switch arrangement being preferably employed to select one from the other.

The apparatus is capable of being used simply as a source of constant voltage varying frequency oscillations by connecting the test terminals 24, 25 to the apparatus under test. Transfer impedance measurements can then be made by connecting the cathode ray oscillograph to the output of the said apparatus under test, which output is connected to terminals 24' and 25' and switch 30 being put into its right hand position in the drawing. With the switch in its left hand position and the apparatus under test connected to terminals 24, 25 admittance tests may be made.

It is not essential that the variation of frequency of the oscillator 3 be mechanically obtained by rotation of a condenser as described. The said variation might, for example, be obtained fully electronically by employing a so-called velocity modulated tube in this oscillator. Again the law of horizontal (time base) sweep in the oscillograph need not be rectilinear; for some purposes a logarithmic law is to be preferred and, if desired, provision may be made of apparatus capable of giving either a logarithmic or rectilinear law at will by operation of a switch. For example the horizontal sweep could be controlled by an amplifier including logarithmic law circuits which could be switched out when desired. Again it is not essential that a frequency discriminator be used to produce the horizontal sweep in the cathode ray oscillograph for this may be produced in other ways, e. g. by cyclically varying a potentiometer, across which a D. C. potential is applied, in synchronism with the means for cyclically varying the variable frequency oscillator.

If desired, means may be provided to enable alternate excursions of the cathode ray beam to "portray" different phenomena—for example to "produce" alternately a network admittance curve and a frequency calibration scale. This involves a switching arrangement for connecting the cathode ray tube input alternately to the admittance network whose curve is to be traced and the frequency calibrating network 33—34, such switching is best accomplished electronically, e. g. by means of a discharge tube circuit having two conditions of electrical stability (so-called "flip-flop" circuit) between which it is triggered at each horizontally deflecting voltage excursion. Such an arrangement would be very convenient also for testing components of unknown characteristics, against a standard component for alternate traces could trace the curve illustrative of the standard and interlacing traces that of the test component.

While I have illustrated a particular embodiment of the present invention, it should be clearly understood that it is not limited thereto since many modifications may be made in the several elements employed and in their arrangement without departing from the spirit and scope of the invention.

What is claimed is:

1. A circuit arrangement for testing electric apparatus comprising, a set of terminals adapted to have said electric apparatus connected thereto, a rectifier circuit coupled to said terminals, means to apply an alternating voltage cyclically varying in frequency to said rectifier circuit to produce a unidirectional current therein varying in proportion to the characteristics of said electric apparatus, means to apply said current to one deflection means of a binary indicating device, means to derive a second unidirectional current proportional to the frequency variation of said alternating voltage, means to apply said second current to the remaining deflection means of said binary indicating device, a calibrating circuit including a fixed frequency oscillator, means to apply said alternating voltage to said calibrating circuit to obtain beat frequency currents at frequencies determined by said fixed frequency oscillator, and means to superimpose said beat frequency currents on one of said unidirectional currents, thereby to obtain a directly calibrated indication of the response of said electric apparatus with respect to frequency.

2. A circuit arrangement for testing electric apparatus comprising, a pair of terminals adapted to have said electric apparatus connected thereto, a rectifier circuit coupled to said terminals, means to apply an alternating voltage cyclically varying in frequency to said rectifier circuit to produce a unidirectional current therein varying in proportion to the impedance of said electric apparatus, means to apply said current to one deflecting means of a binary indicating device, means to derive a second unidirectional current proportional to the frequency variation of said alternating voltage, means to apply said second current to the remaining deflecting means of said binary indicating device to obtain an indication of the impedance of said electric apparatus with respect to frequency, and means to produce an indication of calibration directly on the first said indication, said means comprising a generator of oscillations of fixed frequency, means to combine said alternating voltage and said oscillation of fixed frequency to obtain beat frequency currents at frequencies spaced apart at said fixed frequency, and means to superimpose said beat frequency currents on one of said unidirectional currents.

3. A circuit arrangement for testing electric apparatus comprising, a pair of terminals adapted to have said electric apparatus connected thereto, a rectifier circuit coupled to said terminals, means to apply an alternating voltage cyclically varying in frequency to said rectifier circuit to produce a unidirectional current therein varying in proportion to the impedance of said electric apparatus, means to apply said current to one deflecting means of a binary indicating device, means to derive a second unidirectional current proportional to the frequency variation of said alternating voltage, means to apply said second current to the remaining deflecting means of said binary indicating device, a calibrating circuit including a fixed frequency oscillator, means to apply said alternating voltage to said calibrating circuit to obtain beat frequency currents at frequencies determined by said fixed frequency oscillator, and means to superimpose said beat frequency currents on the first said unidirectional current thereby to obtain directly calibrated indication of the impedance of said electric apparatus with respect to frequency.

4. A circuit arrangement for testing electric apparatus, comprising a pair of terminals adapted to have said electric appartus connected thereto, a rectifier circuit, a rectifier element, an input resistor having one termination thereof connected to the cathode of said rectifier element and the other termination thereof connected to one of said terminals, a capacitor joining said one terminal to the anode of said rectifier element, and a load resistor connected between a point of fixed potential and the anode of said rectifier element, means to apply an alternating voltage cyclically varying in frequency to said rectifier circuit at the cathode of said rectifier element to produce a current in said load resistor varying in proportion to the impedance of said electric apparatus, means to apply said current to one deflecting means of binary indicating device, means to derive a second current proportional to the frequency variations of said alternating voltage, means to apply said second current to the remaining deflecting means of said binary indicating device, a calibrating circuit including a fixed frequency oscllator, means to apply said alternating voltage to said calibrating circuit to obtain beat frequency currents at frequencies determined by said fixed frequency oscillator, and means to superimpose said beat frequency currents on the first said unidirectional current, thereby to obtain a directly calibrated indication of the impedance of said electrical apparatus with respect to frequency.

5. A circuit arrangement for testing electric apparatus comprising a pair of terminals adapted to have said electric apparatus connected thereto, a rectifier circuit, a pair of rectifier elements, input resistors having one termination thereof connected to the cathodes of said rectifier elements and the other termination thereof connected to said terminals, capacitors joining said terminals to the anodes of said rectifier elements, output resistors having one termination thereof connected to the anodes of said rectifier elements and the other terminations joined together and a load resistor connected between a point of fixed potential and said joined output resistors, means to apply an alternating voltage cyclically varying in frequency to said rectifier circuit at the cathodes of said rectifier elements to produce a potential across said load resistor varying in proportion to the impedance of said electric apparatus, means to apply said potential to one deflecting means of binary indicating device, means to derive a second potential proportional to the frequency variations of said alternating voltage, means to apply said second potential to the remaining deflecting means of said binary indicating device, a calibrating circuit including a fixed frequency oscillator, means to apply said alternating voltage to said calibrating circuit to obtain beat frequency potentials at frequencies determined by said fixed frequency oscillator, and means to superimpose said beat frequency potential on the potential across said load resistor thereby to obtain a directly calibrated indication of the impedance of said electrical apparatus with respect to frequency.

6. A circuit arrangement for testing electric apparatus, comprising a pair of terminals adapted to have said electric apparatus connected thereto, a rectifier circuit, a pair of diode electron discharge tubes, input resistors having one termination thereof connected to the cathodes of said diode tubes and the other termination thereof connected to said terminals, capacitors joining said terminals to the anodes of said diode tubes, output resistors having one termination thereof connected to the anodes of said diode tubes and the other terminations joined together and a load resistor connected between a point of fixed potential and said joint output resistors, means to apply an alternating voltage cyclically varying in frequency to said rectifier circuit at the cathodes of said diode tubes to produce a current in said load resistor varying in proportion to the impedance of said electric apparatus, means to apply said current to one deflecting means of a binary indicating device, means to derive a second current proportional to the frequency variation of said alternating voltage, means to apply said second current to the remaining deflecting means of said binary indicating device, a calibrating circuit including a fixed frequency oscillator, means to apply said alternating voltage to said calibrating circuit to obtain beat frequency currents at frequencies determined by said fixed frequency oscillator, and means to superimpose said beat frequency currents on said current in said load resistor, thereby to obtain a directly calibrated indication of the impedance of said electrical apparatus with respect to frequency.

7. A circuit arrangement for testing electric apparatus, comprising a pair of terminals adapted to have said electric apparatus connected thereto, a rectifier circuit, a pair of diode electron discharge tubes, input resistors having one termination thereof connected to the cathodes of said diode tubes and the other termination thereof connected to said terminals, capacitors joining said terminals to the anodes of said diode tubes, output resistors having one termination thereof connected to the anodes of said diode tubes and the other terminations joined together and a load resistor connected between a point of fixed potential and said joined output resistors, means to apply an alternating voltage cyclically varying in frequency to said rectifier circuit at the cathodes of said diode tubes to produce a current in said load resistor varying in proportion to the impedance of said electric apparatus, means to apply said current to one deflecting means of cathode ray indicating device, means to derive a second current proportional to the frequency variations of said alternating voltage, means to apply said second current to the remaining deflecting means of said cathode ray indicating device, a calibrating circuit including a fixed frequency oscillator, means to apply said alternating voltage to said calibrating circuit to obtain beat frequency currents at frequencies determined by said fixed frequency oscillator, and means to superimpose said beat frequency currents on said current in said load resistor, thereby to obtain a directly calibrated display of the impedance of said electrical apparatus with respect to frequency.

8. A circuit arrangement for testing electric apparatus, comprising a pair of terminals adapted to have said electric apparatus connected thereto, a rectifier circuit, a pair of diode electron discharge tubes, input resistors having one termination thereof connected to the cathodes of said diode tubes and the other termination thereof connected to said terminals, capacitors joining said terminals to the anodes of said diode tubes, output resistors having one termination thereof connected to the anodes of said diode tubes and the other terminations joined together and a load resistor connected between a point of fixed potential and said joined output resistors, means to apply an alternating voltage cyclically varying in frequency to said rectifier circuit at the cathodes of said diode tubes to produce a voltage across said load resistor varying in proportion to the impedance of said electric apparatus, means to apply said voltage to one pair of deflecting electrodes of a cathode ray oscillograph, means to derive a second voltage proportional to the frequency variations of said alternating voltage, means to apply said second voltage to the remaining pair of deflecting electrodes of said cathode ray oscillagraph, a calibrating circuit including a fixed frequency oscillator, means to apply said alternating voltage to said calibrating circuit to obtain beat frequency voltages at frequencies determined by said fixed frequency oscillator, means to superimpose said beat frequency voltages on said voltage across said load resistor thereby to obtain a directly calibrated display of the impedance of said electrical apparatus with respect to frequency.

WILLIAM OLIVER AGAR.

REFERENCES CITED

The following references are of record in the file of this patent:

UNITED STATES PATENTS

| Number | Name | Date |
|---|---|---|
| 1,727,388 | Affel | Sept. 10, 1929 |
| 1,994,232 | Schuck, Jr. | Mar. 12, 1935 |
| 2,175,001 | Sherman | Oct. 3, 1939 |
| 2,189,457 | Archer | Feb. 6, 1940 |
| 2,203,750 | Sherman | June 11, 1940 |